United States Patent [19]

Strickler

[11] Patent Number: 5,191,948
[45] Date of Patent: Mar. 9, 1993

[54] WEIGHING APPARATUS WITH RESILIENTLY SUSPENDED PAN SUPPORT ARM

[75] Inventor: Ernst Strickler, Wolfhausen, Switzerland

[73] Assignee: Mottler - Toledo AG, Greifensee, Switzerland

[21] Appl. No.: 698,395

[22] Filed: Apr. 25, 1991

[30] Foreign Application Priority Data

May 23, 1990 [CH] Switzerland ............... 1757/90

[51] Int. Cl.⁵ ........................................... G01G 21/10
[52] U.S. Cl. ................................. 177/188; 177/184; 177/187; 177/229
[58] Field of Search ........ 177/184, 187, 188, 210 EM, 177/154, 156, 229

[56] References Cited

U.S. PATENT DOCUMENTS

| | | | |
|---|---|---|---|
| 4,090,575 | 5/1978 | Kunz et al. | 177/210 EM |
| 4,109,738 | 8/1978 | Kunz | 177/210 EM |
| 4,184,557 | 1/1980 | Kunz | 177/210 EM |
| 4,245,711 | 1/1981 | Kunz | 177/210 EM |
| 4,273,203 | 6/1981 | Blawert et al. | 177/187 |
| 4,361,199 | 11/1982 | Ulicny | 177/154 |
| 4,362,218 | 12/1982 | Shoberg | 177/154 |
| 4,433,740 | 2/1984 | Luechinger | 177/187 |
| 4,461,364 | 7/1984 | Strickler | 177/255 |
| 4,566,548 | 1/1986 | Södler et al. | 177/229 |

*Primary Examiner*—Benjamin R. Fuller
*Assistant Examiner*—Randy W. Gibson
*Attorney, Agent, or Firm*—Laubscher & Laubscher

[57] ABSTRACT

The support arm (29) for the load-receiving pan (28) of an electronic weighing apparatus (2) is resiliently suspended from the vertically arranged load receiving member (15), thereby to isolate the load receiving member from deleterious forces applied to the weighing pan. To this end, one end of the support arm is suspended by a pair of parallel spaced leaf springs (31,33) from the lower end of the load receiving member. Opposed portions at the upper ends of the leaf springs contain relatively outwardly projecting horizontal U-shaped loop portions (43), thereby to afford resilient displacement of the arm in various directions relative to the load receiving member.

5 Claims, 1 Drawing Sheet

WEIGHING APPARATUS WITH RESILIENTLY SUSPENDED PAN SUPPORT ARM

STATEMENT OF THE INVENTION

This invention relates to an improved electronic weighing apparatus including resilient means for connecting a horizontal weighing pan support arm with a vertically displaceable load receiving member, thereby to isolate the load measuring mechanism from shocks and deleterious forces applied to the weighing pan.

BRIEF DESCRIPTION OF THE PRIOR ART

Weighing scales of the electromagnetic load compensation type including a vertical load receiving member guided for vertical displacement by parallel guide means are well known in the prior art, as evidenced, for example, by the prior U.S. Pat. Nos. 4,090,575, 4,109,738, 4,184,557 and 4,245,711, to Kunz among others.

It is known in the electronic weighing scale art to provide a weighing pan carried by a horizontal support arm that is connected at one end with a vertical load receiving member which is guided for vertical displacement relative to a stationary frame. In such scales, the weighing pan is supported by a cone arranged at the other end of the support arm. These known scales possess the drawback that lateral forces or stresses exceeding the maximum load of the weighing pan can lead to permanent damage (i.e., permanent deformation) of the weighing pan support arm.

A laterally elastically yielding suspension of the weighing pan carrier is known from the Luechinger U.S. Pat. No. 4,433,740. By means of two spiral springs, attached laterally on the scale dish carrier and the arm, the latter is kept pressed against the front of the load receiver. If a load placed upon the scale dish exceeds a certain predetermined amount, the arm will tilt away from the load receiver and one can prevent a force greater than the permissible force from acting upon the receiver. Using the known device, one can keep harmful impacts and shocks perfectly isolated from the scale mechanics. Of course, this is connected with an additional mechanical effort for the fastening of the arm of the load receiver and this also increases the mass.

The purpose of the present invention is to create a shock-absorbing, universal elastic connection between the arm and the load receiver, which may be produced at reasonable cost, that is easy to assemble, and that does not increase the weight of the arm.

SUMMARY OF THE INVENTION

Accordingly, a primary object of the present invention is to provide an electronic scale wherein the horizontal weighing pan support arm is resiliently connected with the vertically displaceable load receiving member, thereby to isolate the load receiving member and the accompanying guidance and load measuring means from impacts and shock forces that might be imparted in various directions to the weighing pan, and to the weighing pan support arm.

According to a more specific object of the invention, the weighing pan is supported at one end of the horizontal support arm, the other end of the support arm being suspended from the lower end of the load receiving member by a pair of parallel spaced vertical leaf springs. According to one feature of the invention, the said other end of the horizontal support arm extends through a pair of aligned openings contained in the lower portions of said leaf springs, thereby to afford resilient torsional deformation of the leaf springs upon the application of a torsion-producing force to said horizontal support arm. According to another feature, the upper portions of the leaf springs contain generally U-shaped loop deformations, thereby to afford resilient deformation of the leaf springs upon the application of distorting forces parallel with and normal to the horizontal support arm, respectively.

The attachment of the two leaf springs to a retaining part facilitates a simple pre-assembly and fastening upon the lower end of the load receiver, and there is no need for any changes regarding the conventional fastening of the lower guide on the load receiver.

BRIEF DESCRIPTION OF THE DRAWING

Other objects and advantages of the invention will become apparent from a study of the following specification, when viewed in the light of the accompanying drawing, in which.

DETAILED DESCRIPTION

Figure 1:
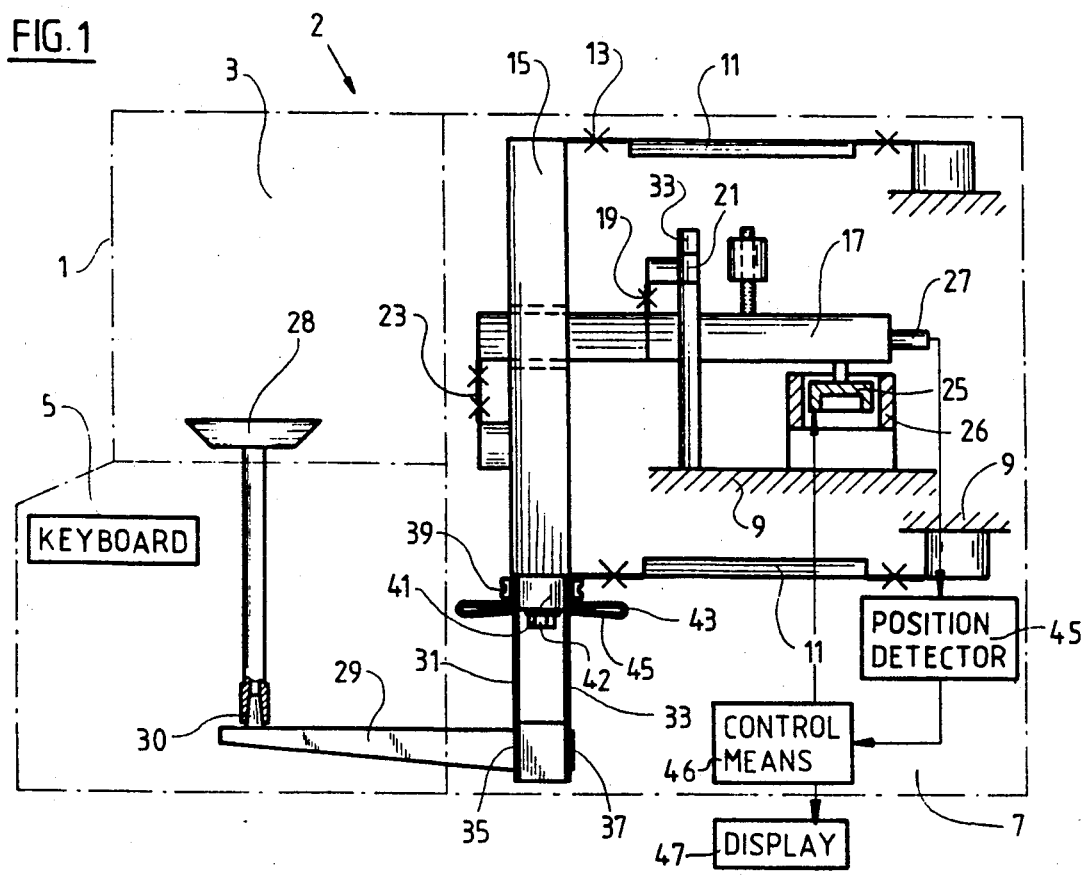
FIG. 1 is a diagrammatic illustration, with certain parts removed for clarity, of the weighing apparatus of the present invention.

Referring first more particularly to FIG. 1, the weighing apparatus 2 illustrated in the drawing is of the electromagnetic load compensation type including a housing 1 having a weighing chamber 3 in which is mounted the load-receiving weighing pan 28. The housing 1, which includes a stationary frame 9, also contains a conventional keyboard 5. A vertical load receiving member 15 is guided for vertical movement relative to the frame 9 by parallel guide means 11 and flexible bearing means 13, as is conventional in the art. The load receiving member is connected by flexible bearing means 23 with one end of a transmission lever 17 that is pivotally supported intermediate its ends by flexible bearings 19 suspended from fixed pillar 21 that is supported by the rigid frame 9. Connected with the other end of the horizontal transmission lever 17 is the movable coil 25 arranged in the electromagnetic field produced by stationary solenoid 26. As is known in the art, position indicating means 27 (for example, a photoelectric cell) transmits a position signal to position detecting means 45 which in turn transmits a corresponding control signal to control means 46. Control means 46 supplies to movable coil 25 an electromagnetic load compensation current of an amplitude sufficient to maintain the movable coil 25 in a stationary no-load position within the electromagnetic field generated by solenoid 26, the magnitude of the compensation current being a function of the applied load, as displayed by display means 47.

Figure 2:
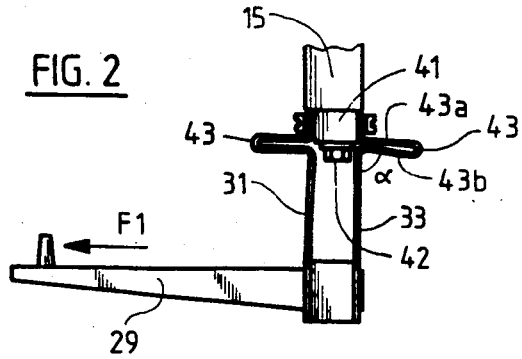
FIGS. 2–4 are detailed views illustrating the manner in which the resilient means support the horizontal support arm upon the application thereby of forces in the parallel, normal and torsion-producing directions, respectively.
Figure 3:
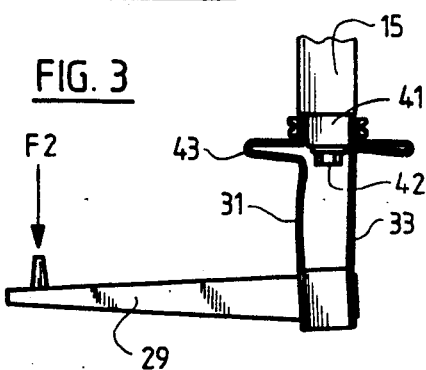

In accordance with a characterizing feature of the present invention, the weighing pan 28 is supported by conical mounting means 30 at one end of a weighing pan support arm 29, the other end of the support arm being suspended from the lower end of load receiving member 15 by resilient suspension means including a pair of leaf springs 31 and 33. The parallel spaced vertical leaf spring means 31 and 33 are flat and are contained in parallel vertical planes extending normal to the support arm 29, which leaf springs contain a pair of aligned openings or slits 35 and 37, respectively, that receive the associated end of the horizontal weighing pan support arm 29. Adjacent their upper ends, the leaf springs are provided with generally U-shaped folds or deformations 43 that extend generally horizontally outwardly in opposite directions parallel with the support arm, respectively, the upper extremities of the leaf springs being connected with the load receiving member 15 by screw means 39 that are connected with a retaining member 41 that, in turn, is bolted to the lower end of the load receiving member 15 by a bolt 42. As shown in FIGS. 2 and 3, the lower arm 43b of the U-shaped deformation loops 43 is normally arranged at an acute angle α relative to the associated vertical portion of the associated leaf spring 31, 33, respectively. Thus, when a force F1 is applied to the support arm 29 in a direction parallel to the longitudinal axis thereof as shown in FIG. 2, the leaf springs 31 and 33 are flexed to isolate the force from the load receiving member 15. Similarly, as shown in FIG. 3, when a downwardly directed force F2 is applied to the end of the arm 29, the leaf spring 31 and associated loop 43 is deformed to isolate the force F2 from the load receiving member 15. Finally, when a torsion-producing force F3 is applied to the horizontal support arm 29, the leaf springs 31 and 33 are flexed to isolate the force F3 from the load-receiving member 15.

It is apparent that, if desired, the connecting member 41 may be eliminated, whereby the upper ends of the leaf springs are connected directly to the lower end of the load receiving member 15. Preferably, the acute angle α is on the order of 85°, although it is apparent that this specific angle is not critical.

Figure 4:
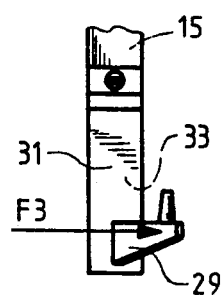

In assembling leaf springs 31, 33 with screws 39, loop 43 of leaf spring 33 is so braced counter-clockwise and loop 43 of leaf spring 31 is so braced in the clockwise direction that there will be prestressing within loops 43 after assembly. With weighing pan 28 unloaded or, in case of loading within the weighing range of the scale, the two leaf springs 31 and 33 are not bent. But as soon as a force F1 acts on scale dish 28 in a horizontal direction, e.g., as a result of bumping the scale, the two leaf springs 31, 33 are deflected laterally. Load receiver 15 and its suspension are essentially isolated from the impact (FIG. 2). If there is an overload F2 in a vertical direction (e.g., from above, as shown in FIG. 3), the two leaf springs 31 and 33 are bent through, whereby loop 43 on leaf spring 31 facilitates a lengthening of the distance between the lower end of the lead receiver up to the fastening point of arm 29 (FIG. 3). If there is a forcing laterally with respect to arm 29, the leaf springs 31 and 33 are torsion-loaded; load receiver 15, or its suspension, again is guarded from the laterally introduced shock (FIG. 4). As soon as loads F1, F2, and F3 are eliminated again, the two leaf springs 31 and 33 return to their starting position. As a result, followup adjustment of the scale will not be necessary in most cases.

What is claimed is:

1. Electronic weighing apparatus, comprising:
   (a) a frame (9);
   (b) a vertical load receiving member (15) having an upper end and a lower end;
   (c) parallel guide means (11) connecting said load receiving member for vertical movement relative to said frame;
   (d) a weighing pan (28);
   (e) a horizontal support arm (29) having a pair of ends a first one of which is connected with said weighing pan; and
   (f) resilient means for suspending the other end of said support arm from the lower end of said load receiving member, said resilient means including a pair of vertical parallel generally flat leaf springs (31, 33) arranged normal to, and spaced longitudinally of, said horizontal support arm.

2. Apparatus as defined in claim 1, wherein said springs have upper and lower ends, and further including:
   (f) means for connecting said upper ends of said leaf springs, respectively, with the lower end of said load-receiving member, said connecting means comprising:
   (1) a retaining member (41) connected between said upper ends of said leaf spring; and
   (2) means (42) for connecting said retaining member with said lower end of said load-receiving member.

3. Apparatus as defined in claim 1, wherein said lower ends of said leaf springs contain a pair of aligned openings (35, 37), said horizontal support arm extending at said other end through said aligned openings, whereby said leaf springs afford torsional resiliency upon an application of a torsional-producing horizontal force (F3) laterally to said one end of said support arm.

4. Apparatus as defined in claim 1, wherein corresponding opposed upper portions of said leaf springs contain generally U-shaped horizontal fold portions (43) that extend outwardly in opposite directions longitudinally of said support arm, respectively, thereby to protect said load receiving member upon an application of force vertically to, or horizontally longitudinally of, said support arm one end.

5. Apparatus as defined in claim 4, wherein said U-shaped fold portions have generally parallel vertically spaced upper and lower leg portions (43a, 43b), each of said lower leg portions being arranged at an acute angle (α) relative to an adjacent vertical portion of an associated leaf spring.

* * * * *